US012355156B2

(12) United States Patent
Sampo

(10) Patent No.: US 12,355,156 B2
(45) Date of Patent: Jul. 8, 2025

(54) PATCH ANTENNA AND ANTENNA DEVICE FOR VEHICLE

(71) Applicant: YOKOWO CO., LTD., Tokyo (JP)

(72) Inventor: Takeshi Sampo, Tomioka (JP)

(73) Assignee: YOKOWO CO., LTD., Tokyo (JP)

( * ) Notice: Subject to any disclaimer, the term of this patent is extended or adjusted under 35 U.S.C. 154(b) by 21 days.

(21) Appl. No.: 18/241,250

(22) Filed: Sep. 1, 2023

(65) Prior Publication Data

US 2023/0411865 A1 Dec. 21, 2023

Related U.S. Application Data

(63) Continuation of application No. 16/971,690, filed as application No. PCT/JP2019/004333 on Feb. 7, 2019, now Pat. No. 11,799,208.

(30) Foreign Application Priority Data

Feb. 23, 2018 (JP) ................................ 2018-030681

(51) Int. Cl.

*H01Q 19/00* (2006.01)
*H01Q 1/32* (2006.01)
*H01Q 9/04* (2006.01)

(52) U.S. Cl.

CPC ......... *H01Q 19/005* (2013.01); *H01Q 1/3283* (2013.01); *H01Q 9/0414* (2013.01)

(58) Field of Classification Search

CPC ... H01Q 1/3283; H01Q 9/0414; H01Q 19/005
See application file for complete search history.

(56) References Cited

U.S. PATENT DOCUMENTS

| | | | | |
|---|---|---|---|---|
| 5,576,718 A * | 11/1996 | Buralli | H01Q 21/065 343/700 MS |
| 7,773,035 B2 | 8/2010 | Murata et al. | |
| 10,594,036 B2 * | 3/2020 | Iida | H01Q 1/3275 |
| 2004/0203390 A1 * | 10/2004 | Inoue | H01Q 1/325 455/422.1 |

(Continued)

FOREIGN PATENT DOCUMENTS

| | | |
|---|---|---|
| JP | H02-70104 A | 3/1990 |
| JP | H05-183327 A | 7/1993 |

(Continued)

OTHER PUBLICATIONS

European Patent Office issued Feb. 6, 2023 in corresponding European Patent Application No. 19756804.1, pages.

(Continued)

*Primary Examiner* — Dameon E Levi
*Assistant Examiner* — Amal Patel
(74) *Attorney, Agent, or Firm* — XSENSUS LLP

(57) ABSTRACT

A patch antenna includes: a radiating element having a flat-plate shape; and a parasitic element provided at a position spaced away from the radiating element in planar view in which the radiating element is seen from a direction perpendicular to a plate surface of the radiating element. A longitudinal direction of the parasitic element is oriented along a direction of a line segment connecting a center of the radiating element and a feeding point in the planar view.

13 Claims, 11 Drawing Sheets

(56) References Cited

U.S. PATENT DOCUMENTS

| | | | | |
|---|---|---|---|---|
| 2008/0088510 | A1* | 4/2008 | Murata .................... | H01Q 3/24<br>343/876 |
| 2008/0180332 | A1 | 7/2008 | Noro et al. | |
| 2008/0316110 | A1 | 12/2008 | Kanemura et al. | |
| 2015/0097738 | A1 | 4/2015 | Sugimoto et al. | |
| 2015/0123838 | A1 | 5/2015 | Shi | |
| 2017/0317418 | A1 | 11/2017 | Garcia et al. | |

FOREIGN PATENT DOCUMENTS

| | | | |
|---|---|---|---|
| JP | 2002-158534 | A | 5/2002 |
| JP | 2003-347838 | A | 12/2003 |
| JP | 2008-182523 | A | 8/2008 |
| JP | 2015-097377 | A | 5/2015 |
| JP | 2016-25592 | | 2/2016 |
| JP | 2016-171439 | A | 9/2016 |
| JP | 2017-188779 | A | 10/2017 |

OTHER PUBLICATIONS

Japanese Office Action issued Nov. 8, 2022 in corresponding Japanese Patent Application No. 2020-501656 (with machine-generated English translation), 8 pages.

Office Action issued on Aug. 16, 2022, in corresponding Japanese patent Application No. 2020-501656, 10 pages.

Extended European search report issued on Oct. 22, 2021, in corresponding European patent Application No. 19756804.1, 10 pages.

International Search Report and Written Opinion of the International Searching Authority mailed on Apr. 23, 2019, in corresponding PCT Application No. PCT/JP2019/004333 filed on Feb. 7, 2019, 10 pages.

* cited by examiner

FIG. 6

| CONDUCTOR LENGTH OF FIRST AND SECOND PARASITIC ELEMENTS [mm] | RELATIVE VALUE OF HALF-POWER ANGLE |
|---|---|
| NO CONDUCTOR | 1.000 |
| 6 | 1.003 |
| 8 | 1.007 |
| 10 | 1.012 |
| 11 | 1.019 |
| 12 | 1.025 |
| 13 | 1.038 |
| 14 | 1.057 |
| 15 | 1.092 |
| 16 | 1.200 |
| 16.5 | 1.363 |
| 17 | 2.033 |

FIG. 7A

| CONDUCTOR LENGTH d OF SECOND PARASITIC ELEMENT [mm] | CONDUCTOR LENGTH c OF FIRST PARASITIC ELEMENT [mm] | MAXIMUM RADIATION DIRECTION [° ] |
|---|---|---|
| 16.5 | NO CONDUCTOR | 24 |
| | 6 | 24 |
| | 8 | 23 |
| | 10 | 23 |
| | 11 | 23 |
| | 12 | 22 |
| | 13 | 22 |
| | 14 | 20 |
| | 15 | 17 |
| | 16 | 11 |
| | 16.3 | 6 |

PATCH ANTENNA AND ANTENNA DEVICE FOR VEHICLE

CROSS-REFERENCE TO RELATED APPLICATIONS

The present application is a continuation of U.S. application Ser. No. 16/971,690, filed Aug. 21, 2020, which is based on PCT filing PCT/JP2019/004333, filed on Feb. 7, 2019, which claims priority to Japanese Patent Application No. 2018-030681, filed on Feb. 23, 2018, the entire disclosure of each are incorporated herein by reference.

TECHNICAL FIELD

The present invention relates to a patch antenna and an antenna device for a vehicle.

BACKGROUND ART

A patch antenna is known as a flat antenna having a quadrangular or circular radiating element with a small area. The patch antenna has a wide range of uses and Patent Literature 1 discloses a patch antenna that can receive circularly polarized satellite-wave signals and linearly polarized ground-wave signals and has a reduced height when disposed.

PRIOR ART DOCUMENTS

Patent Literature

Patent Literature 1: Japanese Unexamined Patent Application Publication No. 2003-347838

SUMMARY OF INVENTION

Problems to be Solved by the Invention

Conventional patch antennas generally have a configuration in which a flat-plate ground plate is placed parallel to a flat-plate radiating element, but the antennas have high directivity in a normal direction (in a direction at an angle of elevation of 90 degrees as viewed from a center of the radiating element) to a plate surface of the radiating element. Therefore, although the gain in high-elevation directions as viewed from the center of the radiating element is relatively high, the gain in low-elevation directions may be low.

A problem to be solved by the present invention is to provide a technique for a patch antenna that can increase the gain in low-elevation directions as viewed from a center of a radiating element.

Solution to the Problems

According to a first aspect of the present invention, there is provided a patch antenna comprising: a radiating element having a flat-plate shape; and a parasitic element provided at a position spaced away from the radiating element in planar view in which the radiating element is seen from a direction perpendicular to a plate surface of the radiating element.

According to the first aspect, the parasitic element is provided by being spaced away from the radiating element in planar view in which the radiating element is seen from the direction perpendicular to the plate surface of the radiating element. Since the parasitic element can vary radiation characteristics of radio waves, it is possible to implement a technique for improving the gain in low-elevation directions as viewed from the center of the radiating element.

According to a second aspect of the present invention, in the patch antenna according to the first aspect, a longitudinal direction of the parasitic element is oriented along a direction of a line segment connecting a center of the radiating element and a feeding point in the planar view.

According to a third aspect of the present invention, in the patch antenna according to the first or second aspect, a longitudinal length of the parasitic element is 0.52 times or more than a maximum length of the radiating element in the planar view.

According to a fourth aspect of the present invention, in the patch antenna according to any one of the first to third aspects, a longitudinal length of the parasitic element is 0.89 times or less than a maximum length of the radiating element in the planar view.

The second to fourth aspects are suitable for improving the gain in low-elevation directions as viewed from the center of the radiating element.

According to a fifth aspect of the present invention, in the patch antenna according to any one of the first to fourth aspects, the parasitic element is provided on a same surface of a dielectric body as the radiating element.

According to the fifth aspect, by providing the parasitic element on the same surface of a dielectric body as the radiating element, it is possible to produce a patch antenna easily that can achieve working effects of any one of the first to fourth aspects.

According to a sixth aspect of the present invention, in the patch antenna according to any one of the first to fifth aspects, the position spaced away from the radiating element is 0.51 times or less than a maximum length of the radiating element in the planar view.

According to a seventh aspect of the present invention, in the patch antenna according to any one of the first to sixth aspects, a difference between a height Hp of a top face of the parasitic element and a height Hr of a top face of the radiating element satisfies $0 \leq Hp-Hr < \alpha \times 0.05$, where $\alpha$ is a maximum length of the radiating element in the planar view.

The sixth or seventh aspect is suitable for improving the gain in low-elevation directions as viewed from the center of the radiating element.

According to an eighth aspect of the invention, in the patch antenna according to any one of the first to seventh aspects, a pair of the parasitic elements is provided on opposite sides of the radiating element.

According to a ninth aspect of the invention, in the patch antenna according to the eighth aspect, the pair of parasitic elements includes a first parasitic element, and a second parasitic element which length in a longitudinal direction is longer than that of the first parasitic element.

According to the eighth aspect, the pair of parasitic elements is provided on opposite sides of the radiating element. Since the pair of parasitic elements is provided, a maximum radiation direction of the radiating element runs along the direction perpendicular to the plate surface of the radiating element. Then, according to the ninth aspect, the pair of parasitic elements includes the first parasitic element, and the second parasitic element which length in a longitudinal direction is longer than that of the first parasitic element. The pair of parasitic elements allows the maximum radiation direction of the radiating element to be changed to any desired direction by varying the radiation characteristics of radio waves.

According to a tenth aspect of the present invention, there is provided an antenna device for a vehicle equipped with the patch antenna according to any one of the first to ninth aspects, the antenna device for the vehicle including: a housing installed in a predetermined orientation at a predetermined position of the vehicle; and a support adapted to support the patch antenna such that the patch antenna is for vertically polarized waves when the housing is installed in the predetermined orientation at the predetermined position.

The tenth aspect can implement an antenna device for a vehicle utilized for vertically polarized waves, the antenna device having improved gain in low-elevation directions as viewed from the center of the radiating element.

BRIEF DESCRIPTION OF DRAWINGS

FIG. 6 is a diagram tabulating relative values of half-power angle in the H-plane with the conductor length of the pair of parasitic elements varied.

FIG. 7A is a diagram tabulating maximum radiation directions in the H-plane when a conductor length of a second parasitic element is made longer than that of a first parasitic element.

DESCRIPTION OF EMBODIMENTS

Figure 1:
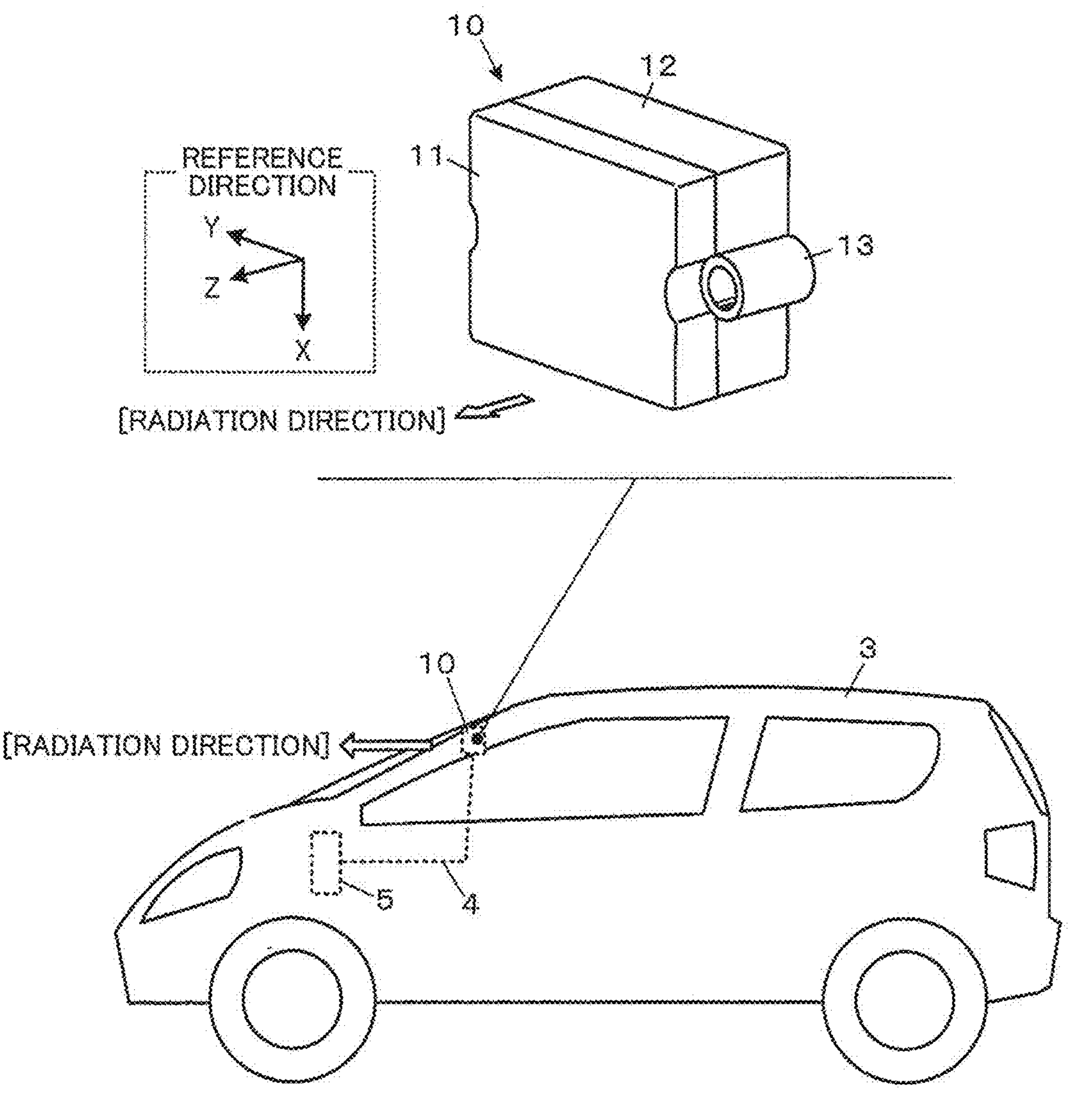
FIG. 1 is an external perspective view illustrating a configuration example of an antenna device for a vehicle and a conceptual diagram illustrating an application example.

An example of embodiments resulting from application of the present invention will be described below, but the forms to which the present invention is applicable are not limited to the embodiment described below.

In the present embodiment, directions are defined as follows. First, in a patch antenna structured such that a radiating element 31 and ground plate 33 (also referred to as a ground conductor plate) are stacked on opposite sides of a dielectric substrate 32 (see FIG. 3), the direction from the dielectric substrate 32 to the radiating element 31 is referred to as a "radiation direction." The radiation direction has a fixed orientation rather than including both the direction from the dielectric substrate 32 to the radiating element 31 and the direction from the radiating element 31 to the dielectric substrate 32. Also, three orthogonal axes in a left-handed system are defined. A coordinate origin of the three orthogonal axes is set at the plate center of the radiating element 31. To make it easy to see the directions of the three orthogonal axes, reference directions parallel to each direction of the three orthogonal axes are added in each drawing. The term "reference directions" is used here because, correctly speaking, the origin of the three orthogonal axes is the plate center of the radiating element 31. The reference directions are shown for reference purposes only.

Of the three orthogonal axes in the left-handed system, the direction perpendicular to the plate surface of the radiating element 31 (normal direction to the plate surface of the radiating element 31) is defined as a Z-axis direction and the orientation of the radiation direction is defined as a Z-axis positive direction. Also, the direction along the direction of a line segment connecting the center of the radiating element 31 and a feeding point (also referred to as a core wire attachment hole) 31*h* is defined as an X-axis direction (see FIG. 2) and the direction from the center of the radiating element 31 to the feeding point 31*h* is defined as an X-axis positive direction. The Y-axis direction and Y-axis positive direction are self-evident because it is known that the three orthogonal axes in the left-handed system are used and because the X-axis positive direction and Z-axis positive direction have been defined.

If the directions are defined in other words, as viewed from the center (origin of the three orthogonal axes) of the radiating element 31, the direction at an angle of elevation of 90 degrees with respect to the directions (plate directions) along the plate surface of the radiating element 31 is the Z-axis positive direction, the direction from the center of the radiating element 31 to the feeding point 31*h* is the X-axis positive direction, and the orientation of the 3 o'clock direction is the Y-axis positive direction when the X-axis positive direction is the 12 o'clock direction. The plate directions of the radiating element 31 may be also called azimuth directions or bearing directions.

The term X-axis direction herein means directions parallel to the X axis and includes both the X-axis positive (+) direction and X-axis negative (−) direction. The same applies to the Y-axis direction and Z-axis direction. Thus, each axis direction corresponds to the reference directions shown in each drawing.

Also, in the patch antenna 20, regarding an E-plane and H-plane, which are an electric field plane of the radiating element 31 and magnetic field plane, respectively, when viewed from the center (origin of the three orthogonal axes) of the radiating element 31, a plane in X-Z directions including the X-axis direction and Z-axis direction is the E-plane while a plane in the Y-Z directions including the Y-axis direction and Z-axis direction is the H-plane. If the planes are defined in other words, a plane including the direction perpendicular to the plate surface of the radiating element 31 and the direction of the line connecting the center of the radiating element 31 and feeding point 31*h* is the E-plane while a plane perpendicular to the E-plane and including the direction perpendicular to the plate surface of the radiating element 31 is the H-plane.

FIG. 1 is an external perspective view illustrating a configuration example of an antenna device for a vehicle 10 according to the present embodiment and a conceptual diagram illustrating an application example.

The antenna device for the vehicle 10, which is equipped with a patch antenna for 5.9-GHz V2X (Vehicle-to-everything; Vehicle-to-Vehicle, Road-to-Vehicle etc.) communications, is installed in a predetermined orientation at a predetermined position of a vehicle 3 and connected to a V2X controller 5 via a coaxial cable 4.

The antenna device for the vehicle 10 is installed in upper part (e.g., near a rearview mirror) of a windshield inside the vehicle in such a way that the radiation direction (Z-axis positive direction) will face forward of the vehicle, i.e., in a traveling direction of the vehicle 3, that the Y-axis positive direction will face to the right of the traveling direction of the vehicle 3, and that the Y-axis negative direction will face to the left of the traveling direction of the vehicle 3.

The installation positions and installed number of the antenna devices for the vehicle 10 can be changed as appropriate according to environmental conditions of expected communications targets and the like. The antenna device for the vehicle 10 may be installed, for example, in two or more locations. Examples of possible installation locations include upper part of a dashboard, a bumper, a number plate mount, and pillars such as A-pillars. The antenna device for the vehicle 10 may be set up on rear glass inside the vehicle in such a way that the radiation direction will face rearward of the vehicle 3, where the term "rearward" means the direction opposite to the traveling direction of the vehicle 3. Also, the antenna device for the vehicle 10 may be set up such that the radiation direction will face the right or left side of the vehicle 3, where the term "right side" means the right side with respect to the traveling direction of the vehicle 3 and the term "left side" means the left side with respect to the traveling direction of the vehicle 3. Also, if the antenna device for the vehicle 10 is structured to meet performance conditions of water resistance and dust resistance, the antenna device 10 may be installed on a roof of the vehicle 3.

The antenna device for the vehicle 10 according to the present embodiment has a quadrangular external appearance and contains the patch antenna 20 in a case having a split structure divided into a first housing 11 and second housing 12 in the radiation direction. Then, as on-vehicle mounting supports 13 provided on side faces of the housings are mounted on the vehicle 3, the patch antenna 20 functions suitably as a vertically polarized antenna. In the present embodiment, the supports 13 are provided as bosses for use to insert bolts or screws for use to install the antenna device for the vehicle 10, on both left and right side faces (opposite side faces in the Y-axis direction) of the housings as viewed from the vehicle 3, but the setup positions of the supports 13 and the number of supports 13 to be set up may be selected as appropriate. Also, the method for installing and fixing the antenna device for the vehicle 10 is not limited to the one that uses bolts or screws, and another method may be used, and accordingly, a structure such as a clip-on structure suitable for the method may be adopted for the supports 13 as appropriate.

The supports 13 support the first housing 11 and second housing 12 such that the first housing 11 and second housing 12 will be installed in predetermined orientations at predetermined positions of the vehicle 3. When the first housing 11 and second housing 12 are installed in predetermined orientations at predetermined positions of the vehicle 3, the supports 13 support the patch antenna 20 such that the patch antenna 20 will function as a vertically polarized antenna.

Figure 2:
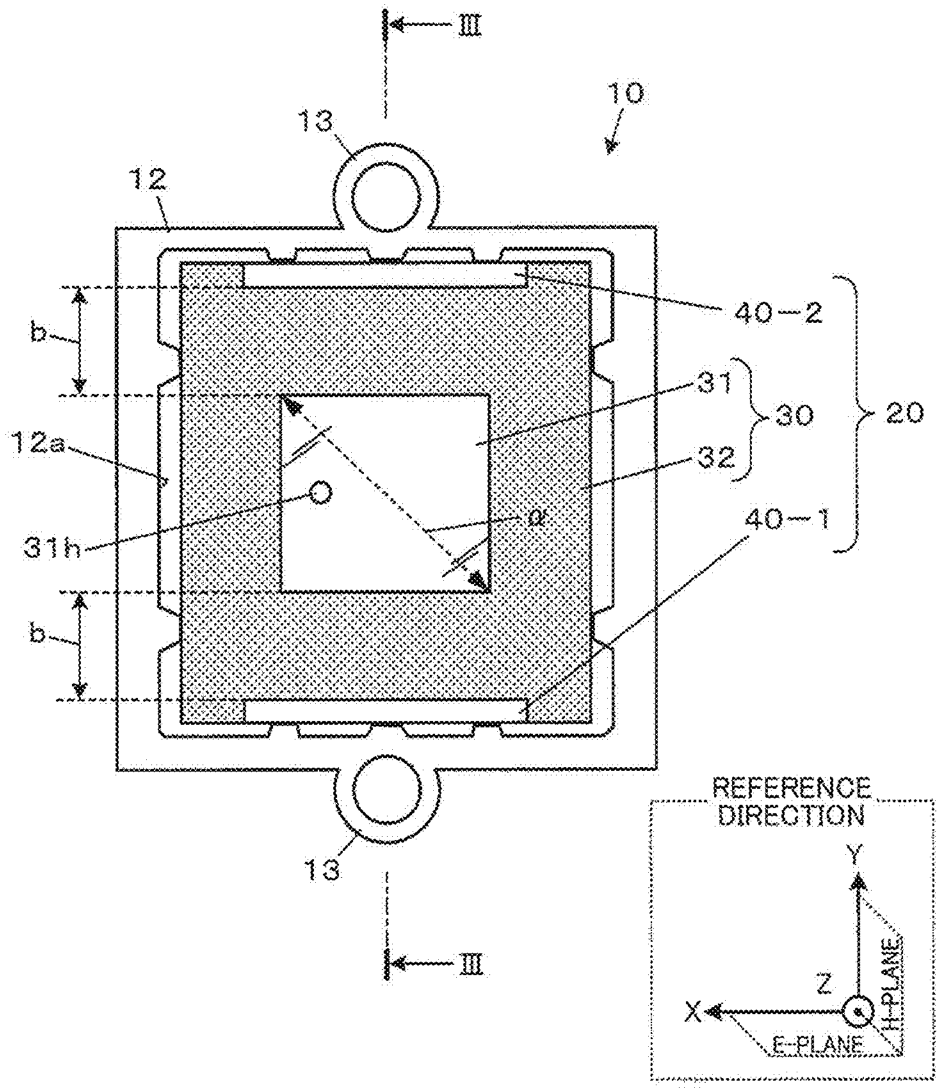
FIG. 2 is a diagram explaining an internal configuration example of the antenna device for the vehicle.
Figure 3:
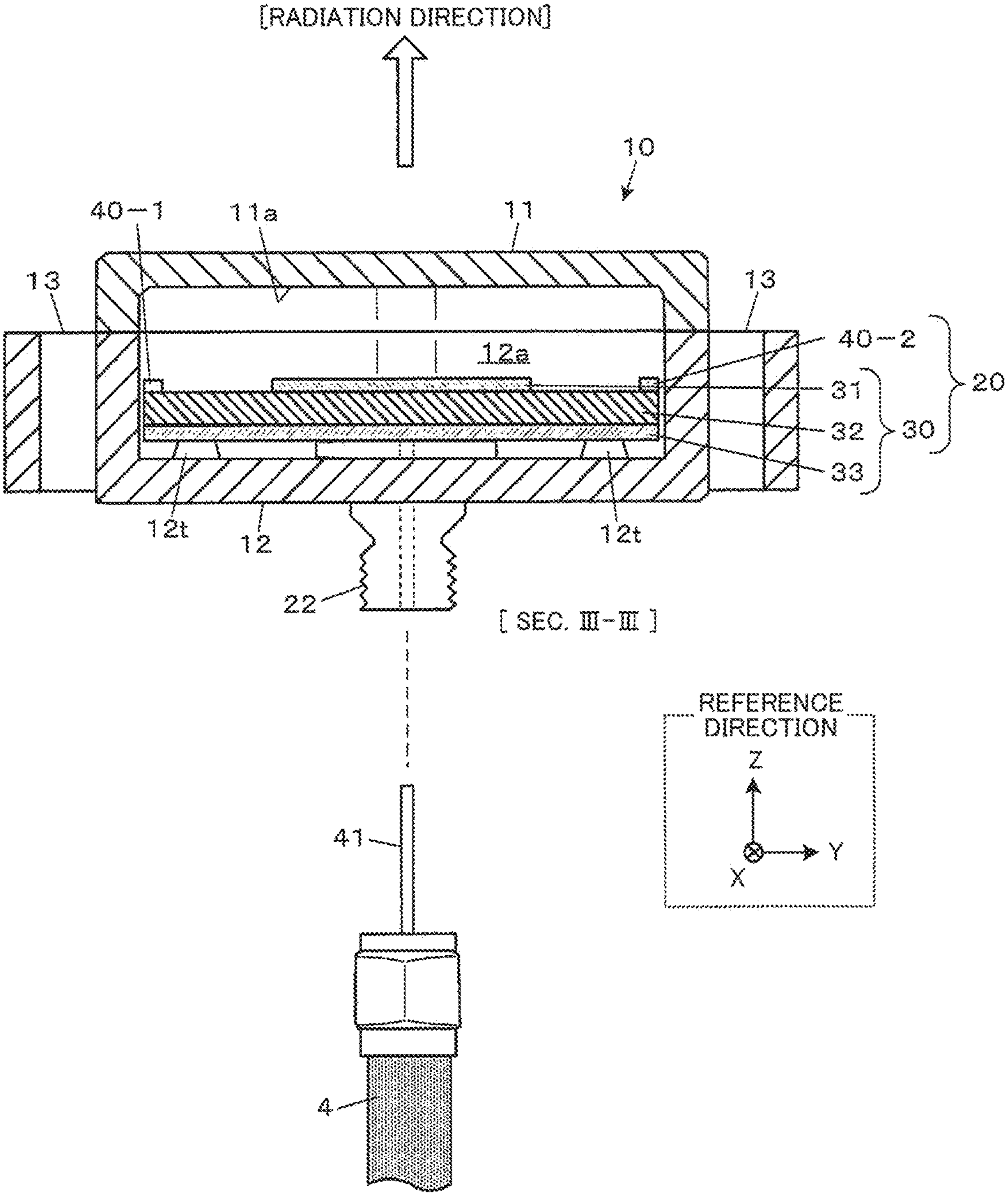
FIG. 3 is a longitudinal sectional view of the antenna device for the vehicle taken along line in FIG. 2.

FIG. 2 is a diagram explaining an internal configuration example of the antenna device for the vehicle 10, illustrating the inside of the second housing 12 as viewed from the Z-axis positive direction with the first housing 11 removed. FIG. 3 is a diagram explaining an internal configuration example of the antenna device for the vehicle 10 similarly, and is also a longitudinal sectional view of the antenna device for the vehicle 10, including the first housing 11, taken along line in FIG. 2.

The first housing 11 defines an upper accommodation space 11*a*, which is a recess, and the second housing 12 defines a lower accommodation space 12*a*, which is a recess. The upper accommodation space 11*a* and lower accommodation space 12*a* become a single continuous accommodation space when the first housing 11 and second housing 12 are assembled together. The patch antenna 20 is installed so as to fit in the accommodation space, and mainly in the lower accommodation space 12*a*.

The patch antenna 20 includes an antenna main body 30 and a pair of parasitic elements (40-1 and 40-2).

The antenna main body 30 has, for example, a quadrangular outer shape as viewed from the Z-axis positive direction and includes the radiating element 31, the dielectric substrate 32, and the ground plate 33 in this order from the top in FIG. 3. As with conventional patch antennas, the antenna main body 30 can be created by the application of a manufacturing method for printed circuit boards.

The radiating element 31 has a quadrangular plate shape when viewed from the Z-axis positive direction and has a core wire attachment hole 31*h* at a position offset (shifted) from the plate center in the X-axis positive direction (direction along a polarization plane of linearly polarized waves of the patch antenna 20), where the core wire attachment hole 31*h* is a through-hole running in the Z-axis direction and used to insert and fix a core wire 41 of the coaxial cable 4. The core wire attachment hole 31*h* serves as a feeding point. Thus, the feeding point will be referred to as the feeding point 31*h* using the same reference sign, as appropriate. According to the present embodiment, the radiating element 31 is square in shape when viewed from the Z-axis positive direction, and is designed such that each of its sides is 13.5 mm long. In FIG. 3, to facilitate understanding of the structure, the radiating element 31 and ground plate 33 are illustrated with intentionally increased thickness in the Z-axis direction, but actually these components may be formed as thin, plate-like films.

The dielectric substrate 32 has a wider area than the radiating element 31 when viewed from the Z-axis positive direction. Besides, the dielectric substrate 32 has a non-illustrated core wire insertion hole that is configured to penetrate the dielectric substrate 32 in the Z-axis direction and positioned in such a way as to be communicated with the core wire attachment hole 31*h* in the radiating element 31 during assembly.

The ground plate 33 has a shape that is the same as or slightly smaller than an undersurface of the dielectric substrate 32 and has a non-illustrated core wire insertion hole that is communicated with the core wire attachment hole 31*h* in the radiating element 31 and a core wire insertion hole in the dielectric substrate 32 during assembly. Besides, a coaxial substrate connector 22 is mounted on an undersurface of the ground plate 33 through a non-illustrated insertion hole provided in a bottom portion of the second housing 12 in such a way as to be coaxial with the core wire insertion hole in the ground plate 33.

The pair of parasitic elements 40 (40-1 and 40-2) is rodlike plate conductors (metal plates) when viewed from the Z-axis positive direction. The pair of parasitic elements 40 is provided at positions on opposite sides of the radiating element 31 by being spaced a predetermined distance b away from the opposite sides of the radiating element 31 in planar view in which the radiating element 31 is seen from the direction perpendicular to the plate surface of the radiating element 31 (in planar view in which the radiating element 31 is seen from the Z-axis positive direction). If the parasitic elements 40 are not spaced away from the radiating element 31, the parasitic elements 40 would operate as if they were part of the radiating element 31, which might result in changes in the frequency obtained by the patch antenna 20.

More specifically, for example, on peripheral edges of a top face of the dielectric substrate 32, the pair of parasitic elements 40-1 and 40-2 is placed at positions on opposite sides of a line segment connecting the center of the radiating element 31 and feeding point 31*h*, with respective longitudinal directions of the parasitic elements 40-1 and 40-2 being orientated along the direction of the line segment (X-axis direction) when viewed from the Z-axis positive direction. Hereinafter, one of the pair of parasitic elements 40-1 and 40-2 (e.g., the one on the lower side of FIG. 2, i.e., on the side of the Y-axis negative direction), i.e., the parasitic element will also be referred to as a first parasitic element 40-1 as appropriate, and the other parasitic element 40-2 (the one on the upper side of FIG. 2, i.e., on the side of the Y-axis positive direction) will also be referred to as a second parasitic element 40-2 as appropriate.

During assembly, the antenna main body 30 is fixed to the bottom portion of the second housing 12. More specifically, a protrusion 12*t* protruding in the Z-axis positive direction is provided on the bottom portion of the second housing 12. The antenna main body 30 and the protrusion 12*t* are fixed together, with the undersurface (end face on the side of the Z-axis negative direction) of the ground plate 33 abutting against a tip of the protrusion 12*t*. Any fixing method can be selected as appropriate, including, for example, a method of bonding together the ground plate 33 and protrusion 12*t*. Also, spacing between the second housing 12 and antenna main body 30 (ground plate 33) may be an air layer (space), or a resin layer, which is an electrically insulative material. When the spacing is a resin layer, the resin can be used both as a space filler and bonding agent.

Next, effects of the patch antenna 20 according to the present embodiment will be described. In describing the effects, a maximum length of a diagonal line of the radiating element 31 as viewed from the Z-axis positive direction will be referred to as a "maximum radiating element length" and denoted by "α" as illustrated in FIG. 2. According to the present embodiment, since the radiating element 31 has a square shape, of which each side is 13.5 mm long, the maximum radiating element length α is 19.1 mm. The conductor lengths of the parasitic elements 40-1 and 40-2 (i.e., the longitudinal lengths of the parasitic elements 40-1 and and the distance b between the radiating element 31 and parasitic elements 40-1 and 40-2 are expressed as a magnification of the maximum radiating element length α and the actual length is shown in parentheses just behind the maximum radiating element length α. For example, if the conductor length is given as 0.86α (approximately 16.5 mm), the length in question is 0.86α times the maximum radiating element length α of 19.1 mm, and approximately 16.5 mm in the parentheses is the actual length.

Figure 4:
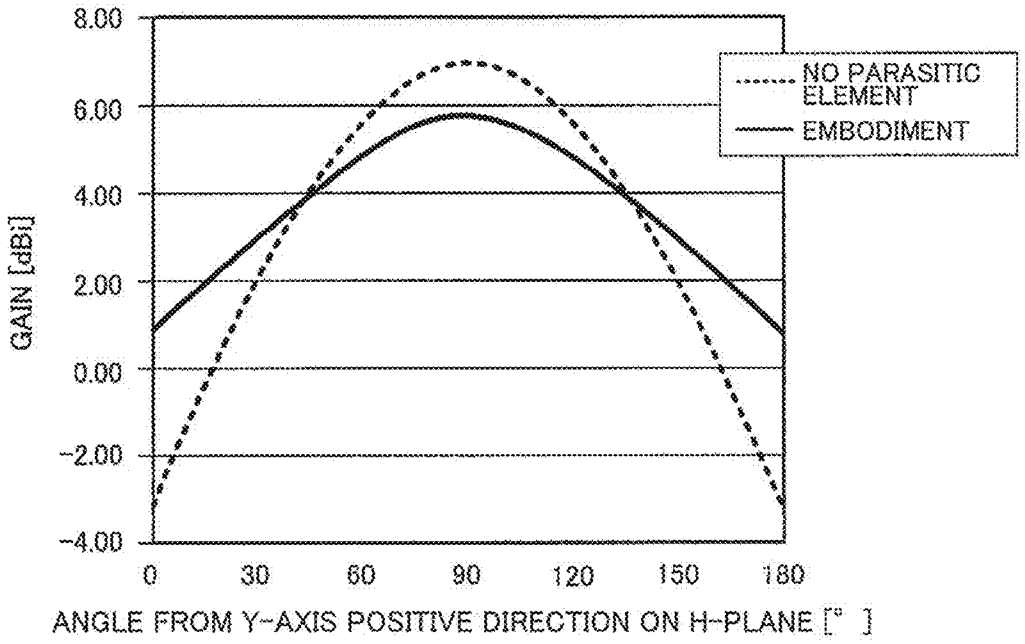
FIG. 4 illustrates gain characteristic curves in an H-plane (plane in Y-Z directions) of the antenna device for the vehicle.

First, FIG. 4 illustrates gain characteristic curves in the H-plane (plane in Y-Z directions), and antenna gain with the Y-axis positive direction in the H-plane being set to 0 degrees and the Y-axis negative direction being set to 180 degrees. The 90-degree direction coincides with the Z-axis positive direction and corresponds to the direction at an angle of elevation of 90 degrees as viewed from the center of the radiating element 31. The solid line represents antenna gain characteristics of the patch antenna 20 according to the present embodiment in a configuration in which the conductor lengths of the parasitic elements 40-1 and 40-2 are set to 0.86α (approximately 16.5 mm) and the distance b is set to 0.25α (approximately 4.75 mm). On the other hand, the broken line represents antenna gain characteristics of a comparative configuration corresponding to a conventional technique in which the pair of parasitic elements 40-1 and 40-2 is omitted.

As illustrated in FIG. 4, when attention is focused on ranges of 0 to 45 degrees and 135 to 180 degrees, which are low-elevation directions as viewed from the center of the radiating element 31, the gain is improved compared to the configuration in which the pair of parasitic elements 40-1 and 40-2 is omitted, indicating a working effect of the pair of parasitic elements and 40-2.

Figure 5:
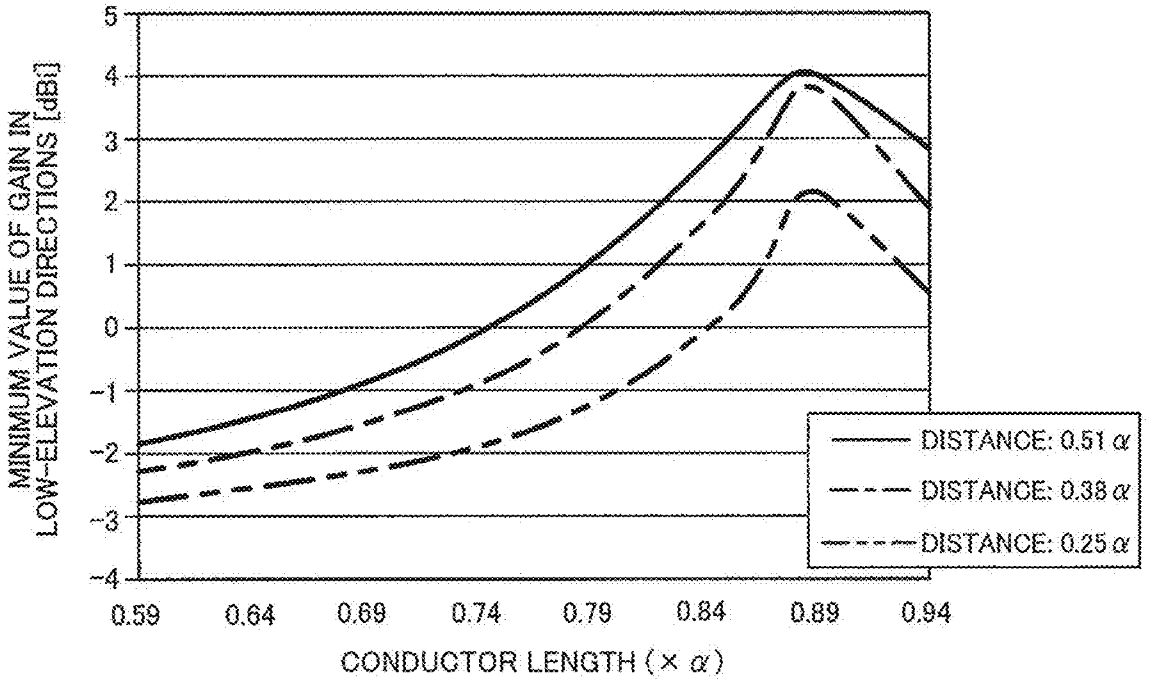
FIG. 5 illustrates gain characteristic curves in the H-plane with a conductor length of a pair of parasitic elements varied.

Next, FIG. 5 illustrates gain characteristic curves obtained by graphically plotting minimum values of gain in low-elevation directions in the H-plane (in the ranges of 0 to 45 degrees and 135 to 180 degrees with the Y-axis positive direction in the H-plane being set to 0 degrees and the Y-axis negative direction being set to 180 degrees) when the conductor length of the pair of parasitic elements 40-1 and 40-2 is varied, where the gain characteristic curves obtained by varying the conductor length and using different distances b are represented by different line styles. Specifically, the solid line is a gain characteristic curve obtained when the distance b is set to 0.51α (approximately 9.75 mm), the chain line is a gain characteristic curve obtained when the distance b is set to 0.38α (approximately 7.25 mm), and the chain double-dashed line is a gain characteristic curve obtained when the distance b is set to 0.25α (approximately 4.75 mm). FIG. 6 is a diagram tabulating relative values of half-power angle in the H-plane by varying the conductor length of the pair of parasitic elements 40-1 and 40-2 with the distance b set to 4.75 mm. In FIG. 6, "No conductor" in the topmost row of the conductor length column corresponds to the comparative configuration in which the pair of parasitic elements 40-1 and 40-2 is omitted and indicates the relative value (relative value of half-power angle) when the half-power angle of the comparative configuration is set to "1.000."

As illustrated in FIG. 5, when the conductor lengths of the pair of parasitic elements 40-1 and 40-2 are increased, the minimum values of gain in low-elevation directions increase as well. Then, peaks are reached when the conductor lengths are around 0.89α (approximately 17.0 mm), and after the peaks, the minimum values of gain show a downward trend. However, with increases in the conductor lengths, the patch antenna 20 increases in size accordingly. Thus, considering effects of downsizing of the patch antenna 20 (that also is downsizing of the antenna device for the vehicle 10), desirably the conductor lengths are 0.89α (approximately 17.0 mm) or less, which is 0.89 times or less the maximum length α of the radiating element.

On the other hand, regarding a lower limit of the conductor length, as illustrated in FIG. 6, when the conductor length is set to 10 mm, the half-power angle can be increased 1.2% over the comparative configuration, and larger values of the conductor length can further increase the half-power angle. Also, when the conductor length is set to 8 mm, the half-power angle can be increased 0.7% over the comparative configuration. Therefore, the conductor length that increases the half-power angle 1% over the comparative configuration is (10+8)×(1/(1.2+0.7))= approximately 9.47 mm by a simple proportional calculation. Thus, allowing for a margin of safety, to increase the half-power angle 1% or more over the comparative configuration, desirably the conductor length is 0.52α (approximately 9.99 mm) or above, which is 0.52 times or more than the maximum length α of the radiating element.

Also, when attention is focused on the distance b in FIG. 5, as the distance b is set to 0.25α (approximately 4.75 mm), to 0.38α (approximately 7.25 mm), and to 0.51α (approximately 9.75 mm) in this order, the minimum values of gain in low-elevation directions increase as well. However, when the minimum values of gain in low-elevation directions at the conductor length of around 0.89α are noted, the gain increase range from the gain at a distance b of 0.38α (approximately 7.25 mm) to the gain at a distance b of 0.51α (approximately 9.75 mm) is smaller than the gain increase range from the gain at a distance b of 0.25α (approximately 4.75 mm) to the gain at a distance b of 0.38α (approximately 7.25 mm). Therefore, it is expected that after the distance b is increased to a certain level, the gain no longer increases greatly. Besides, with increases in the distance b, the patch antenna 20 increases in size accordingly. Thus, from the viewpoint of downsizing the patch antenna 20 (downsizing the antenna device for the vehicle 10), desirably the distance b is 0.51α (approximately 9.75 mm) or less, which is 0.51 times or less the maximum length α of the radiating element.

As described above, according to the present embodiment, it is possible to improve the gain in low-elevation directions as viewed from the center of the radiating element 31 in the patch antenna 20.

Whereas an example of embodiments resulting from application of the present invention has been described above, the forms to which the present invention is applicable are not limited to the above embodiment, and components can be added, omitted, or changed as appropriate.

First Example of Modifications

Figure 7B:
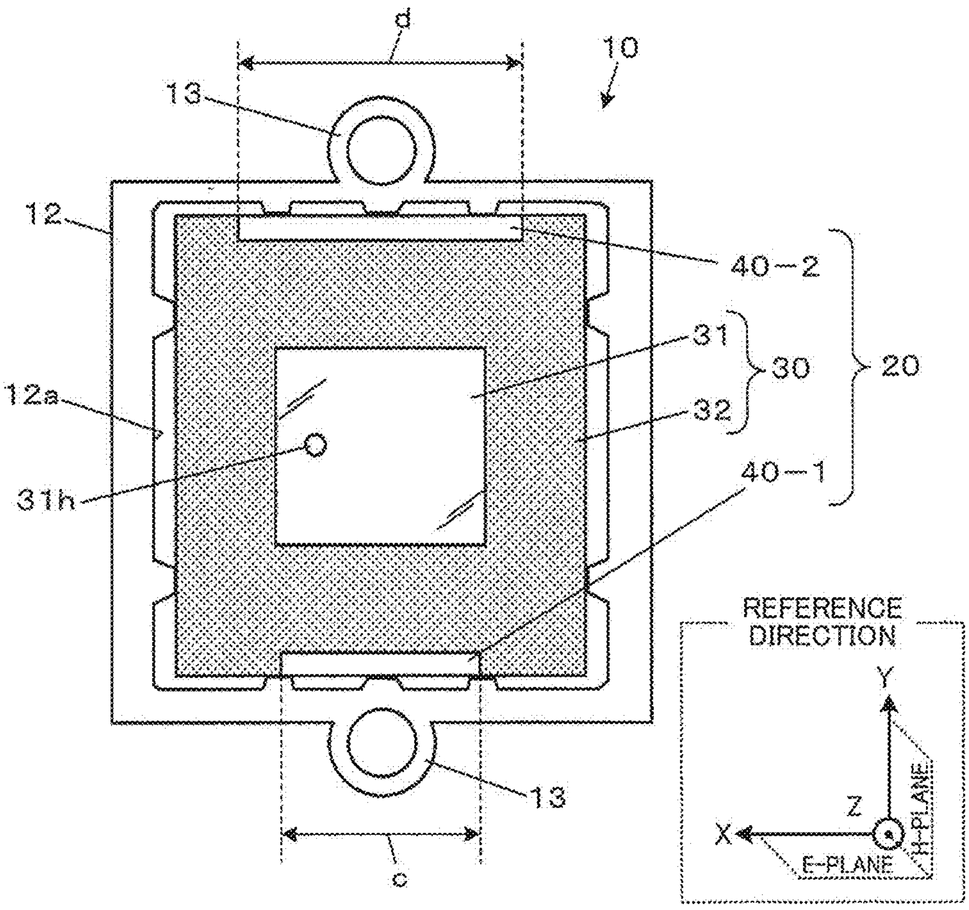
FIG. 7B is an internal configuration diagram of the antenna device for the vehicle, illustrating conductor lengths.

For example, in the configuration of the above embodiment, the parasitic elements 40-1 and 40-2 have the same conductor length. In contrast, the first parasitic element 40-1 and second parasitic element 40-2 may have different conductor lengths. FIG. 7A is a diagram tabulating maximum radiation directions in the H-plane when a conductor length d of the second parasitic element 40-2 is fixed and a conductor length c of the first parasitic element 40-1 is varied. FIG. 7B is an internal configuration diagram of an antenna device for the vehicle 10 equivalent to the one illustrated in FIG. 2, illustrating the conductor length c of the first parasitic element 40-1 and the conductor length d of the second parasitic element 40-2. In FIG. 7A, "No conductor" in the topmost row of the conductor length c column corresponds to a configuration in which only the second parasitic element 40-2 is placed without the first parasitic element 40-1. The maximum radiation directions correspond to azimuths in the H-plane, which is a plane in Y-Z directions when the Z-axis positive direction corresponding to the direction at an angle of elevation of 90 degrees as viewed from the center of the radiating element 31 is set to 0 degrees and the Y-axis positive direction is set to 90 degrees.

Figure 8:
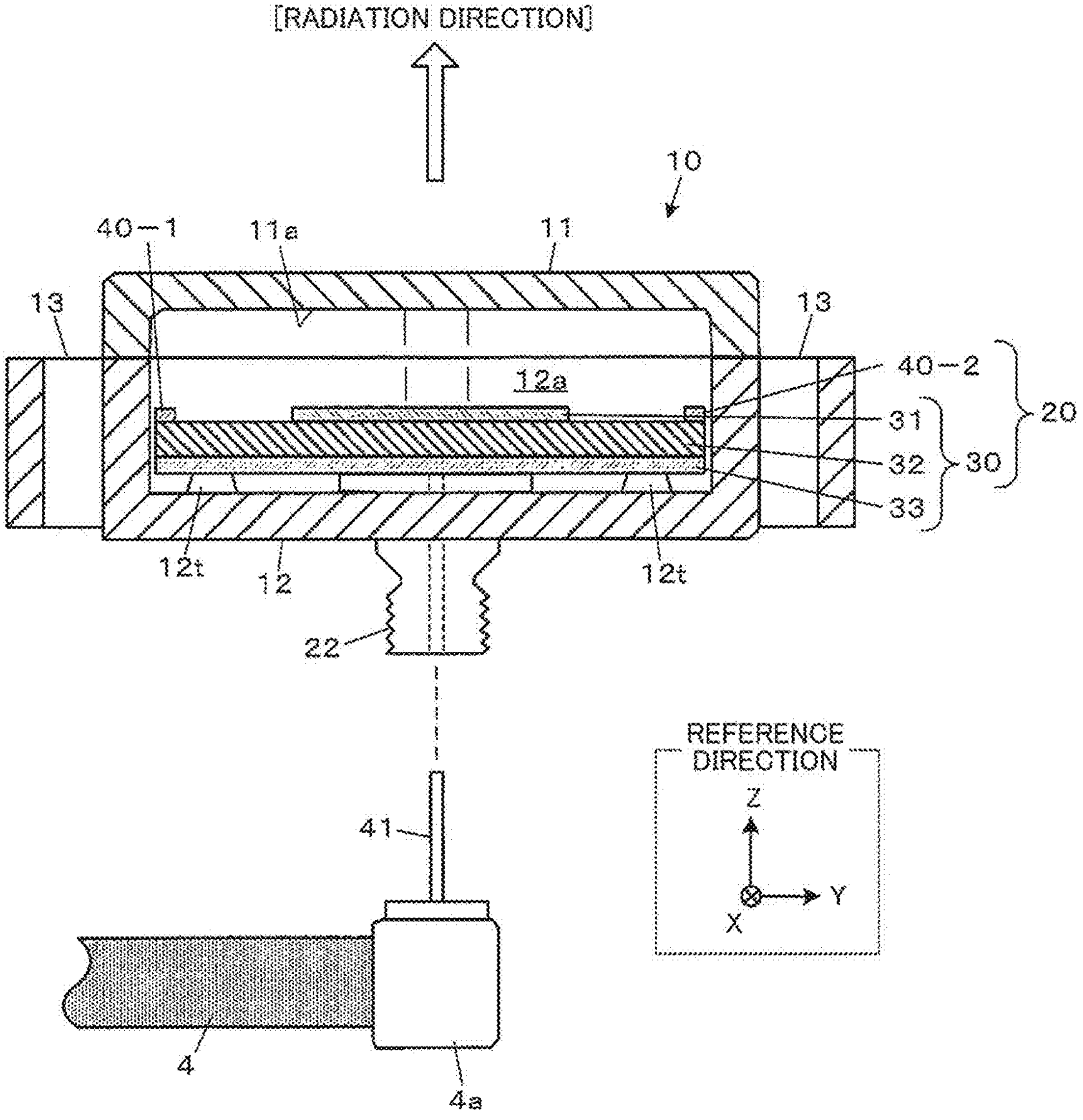
FIG. 8 is a diagram explaining a wiring direction of a coaxial cable in a modification.

As illustrated in FIG. 7A, for example, when the conductor length of the first parasitic element 40-1 is varied with the conductor length of the second parasitic element 40-2 fixed, the maximum radiation direction changes. Specifically, when the conductor length c is increased gradually from 6 mm with the conductor length d fixed, the azimuth of the maximum radiation direction gradually approaches 0 degrees. Then, although not illustrated, as the conductor length c is increased to the same length as the conductor length d, the azimuth of the maximum radiation direction becomes 0 degrees. Thus, by configuring the patch antenna 20 by changing the conductor lengths c and d, it is possible to alter the maximum radiation direction. One of the reasons why the alteration is necessary is installation environment of the antenna device for the vehicle 10. Specifically, for example, in installing the antenna device for the vehicle 10 on the vehicle 3, a wiring direction of a coaxial cable may be limited on account of layout and the like in the vehicle. For example, available configurations are not limited to the one in which the coaxial cable 4 is wired by being inserted perpendicularly to the plate surface of the radiating element 31 as illustrated in FIG. 3, and as illustrated in FIG. 8, by adopting a connector whose wiring direction runs along the plate surface of the radiating element 31, a coaxial cable **4*a* is sometimes wired in parallel to the plate surface. The wiring direction affects radiation characteristics of radio waves, which could cause the maximum radiation direction to shift from the direction (e.g., the forward direction of the vehicle 3) expected at the time of installation. Thus, if the respective conductor lengths of the parasitic elements 40-1 and 40-2 are set appropriately by taking into consideration the influence of the wiring configuration of the patch antenna 20 on the radiation characteristics of radio waves, it is possible to make an alteration during installation of the antenna device for the vehicle 10 on the vehicle 3 such that the maximum radiation direction will match a desired radiation direction. Also, even when a desired radiation direction is shifted from the forward direction of the vehicle as with, for example, an electronic toll collection system (ETC) antenna, if the respective conductor lengths of the parasitic elements 40-1 and 40-2 are changed according to the radiation direction, the antenna can be applied similarly. It is sufficient that the conductor length of at least one of the parasitic elements 40-1 and 40-2 is 0.89α (approximately 17.0 mm) or less, which is 0.89 times or less than the maximum length α of the radiating element. More suitably both the parasitic elements satisfy this condition. Furthermore, it is sufficient that the distance b of at least one of the parasitic elements 40-1 and 40-2** is 0.51α (approximately 9.75 mm) or less, which is 0.51 times or less than the maximum length α of the radiating element. More suitably both the parasitic elements satisfy this condition.

Second Example of Modifications

Figure 9:
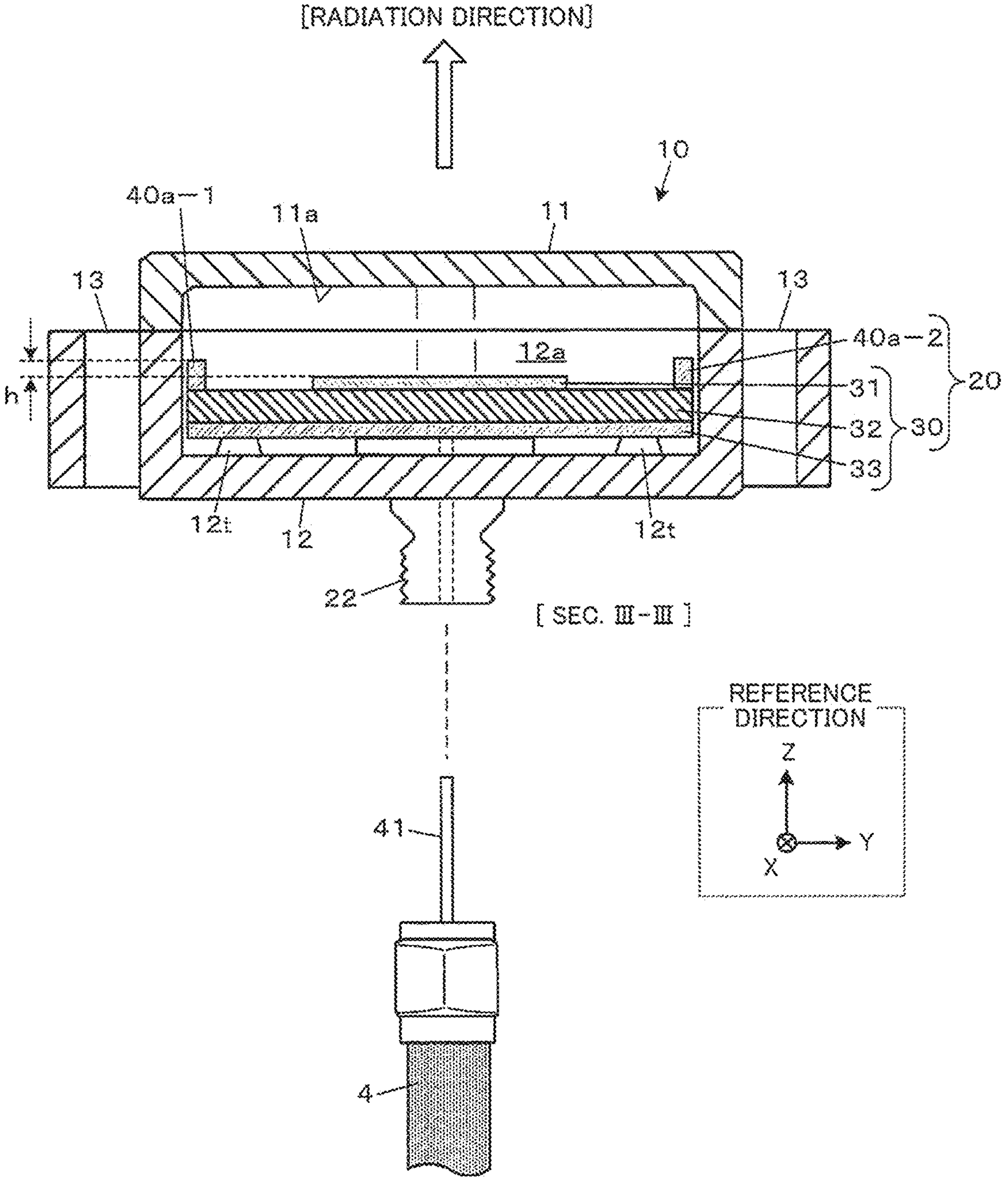
FIG. 9 is a diagram illustrating a modification in which top faces of a pair of parasitic elements and a top face of a radiating element are set to different heights.

Also, in the above embodiment, description has been given of an example in which the pair of parasitic elements 40-1 and 40-2 is provided on the peripheral edges of the top face of the dielectric substrate 32 such that the top faces of the parasitic elements 40-1 and 40-2 will be flush with the top face of the radiating element 31. In contrast, for example, as illustrated in FIG. 9, the pair of parasitic elements 40-1 and 40-2 may be provided such that the top faces thereof will differ in height from the top face of the radiating element 31. More specifically, FIG. 9 illustrates an example in which the top faces of the parasitic elements 40-1 and 40-2 are set higher than that of the radiating element 31. Gain characteristics in the H-plane (plane in Y-Z directions) that result when the height difference (top-face height difference) h between the parasitic elements and radiating element illustrated in FIG. 9 will be described with reference to FIG. 10. If Hp denotes the height of the top face of the parasitic elements 40-1 and 40-2 and Hr denotes the height of the top face of the radiating element 31, the top-face height difference h is given by Hp-Hr. Hp and Hr are heights with respect to the top face of the dielectric substrate 32.

Figure 10:
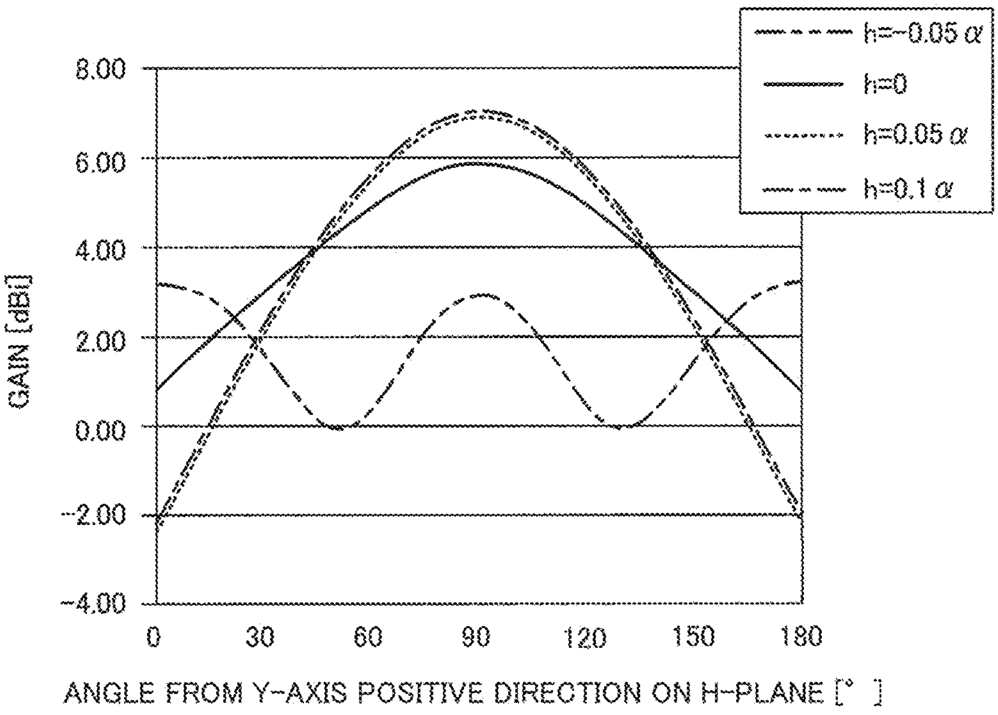
FIG. 10 illustrates gain characteristic curves with a top-face height difference h varied.

FIG. 10 illustrates gain characteristic curves of gain vs. azimuth in the H-plane (plane in Y-Z directions) with the Y-axis positive direction being set to 0 degrees and the Y-axis negative direction being set to 180 degrees, where the gain characteristic curves obtained by varying the top-face height difference h are represented by different line styles. Specifically, the solid line is a gain characteristic curve of a configuration in which the top-face height difference h=0 (i.e., Hp=Hr), the broken line is a gain characteristic curve of a configuration in which the top-face height difference h=0.05α (Hp>Hr and the difference between Hp and Hr is 0.05α, which is approximately 1 mm), the chain line is a gain characteristic curve of a configuration in which the top-face height difference h=0.1α (Hp>Hr and the difference between Hp and Hr is 0.1α, which is approximately 2 mm), and the chain double-dashed line is a gain characteristic curve of a configuration in which the top-face height difference h=−0.05α (Hp<Hr and the difference between Hp and Hr is 0.05α, which is approximately 1 mm). In any of the configurations, the conductor lengths c and d of the parasitic elements 40-1 and 40-2 are 0.86α (approximately 16.5 mm) and the distance b is 0.25α (approximately 4.75 mm).

First, in FIG. 10, an average value of gain (average gain) over an azimuth range of 0 to 180 degrees in the configuration of h=−0.05α represented by the chain double-dashed line and an average gain over an azimuth range of 0 to 180 degrees in the configuration of h=0 represented by the solid line are found and compared. Then, the average gain when h=−0.05α is 1.655831 dBi and the average gain when h=0 is 3.784148 dBi. That is, the average gain obtained from the configuration of h=−0.05α is remarkably lower than the average gain obtained from the configuration of h=0. Thus, desirably the difference between the top-face height Hp of the parasitic elements **40*a*-1 and 40*a*-2 and the top-face height Hr of the radiating element 31 is 0 mm≤Hp−Hr. Next, when attention is focused on ranges of 0 to 45 degrees and 135 to 180 degrees, which are low-elevation directions as viewed from the center of the radiating element 31, in the configuration of h=0.05α represented by the broken line and the configuration of h=0.1α represented by the chain line in FIG. 10, the gain in low-elevation directions is lower than in the configuration of h=0. The configuration of h=0.05α and the configuration of h=0.1α are almost equal in gain in low-elevation directions. Thus, desirably the difference between the top-face height Hp of the parasitic elements 40*a*-1 and 40*a*-2 and the top-face height Hr of the radiating element 31 satisfies Hp−Hr<0.05α. From the above discussion, desirably 0 mm≤Hp−Hr. It is sufficient that the top-face height Hp of at least one of the pair of parasitic elements 40-1 and 40-2** satisfies 0 mm≤Hp−Hr<0.05α. More suitably both the parasitic elements satisfy this condition.

The outer shape of the antenna main body 30 as viewed from the Z-axis positive direction is not limited to the quadrangular shape illustrated by example in FIG. 2, and may be a circular or other shape. Also, the outer shape of the radiating element 31 as viewed from the Z-axis positive direction is not limited to the quadrangular shape illustrated by example in FIG. 2, and may be a circular or other shape. Since the maximum length α of the radiating element as viewed from the Z-axis positive direction is the maximum length of the diagonal line, when the outer shape of the radiating element 31 as viewed from the Z-axis positive direction is circular, the maximum length α of the radiating element is the maximum length of a diameter of the radiating element 31. Also, the longitudinal direction of any one of the pair of parasitic elements 40-1 and 40-2 may be orientated along the direction of a line segment (X-axis direction) connecting the center of the radiating element 31 and feeding point **31*h*** when viewed from the Z-axis positive direction. More suitably both the parasitic elements satisfy this condition.

Third Example of Modifications

Figure 11:
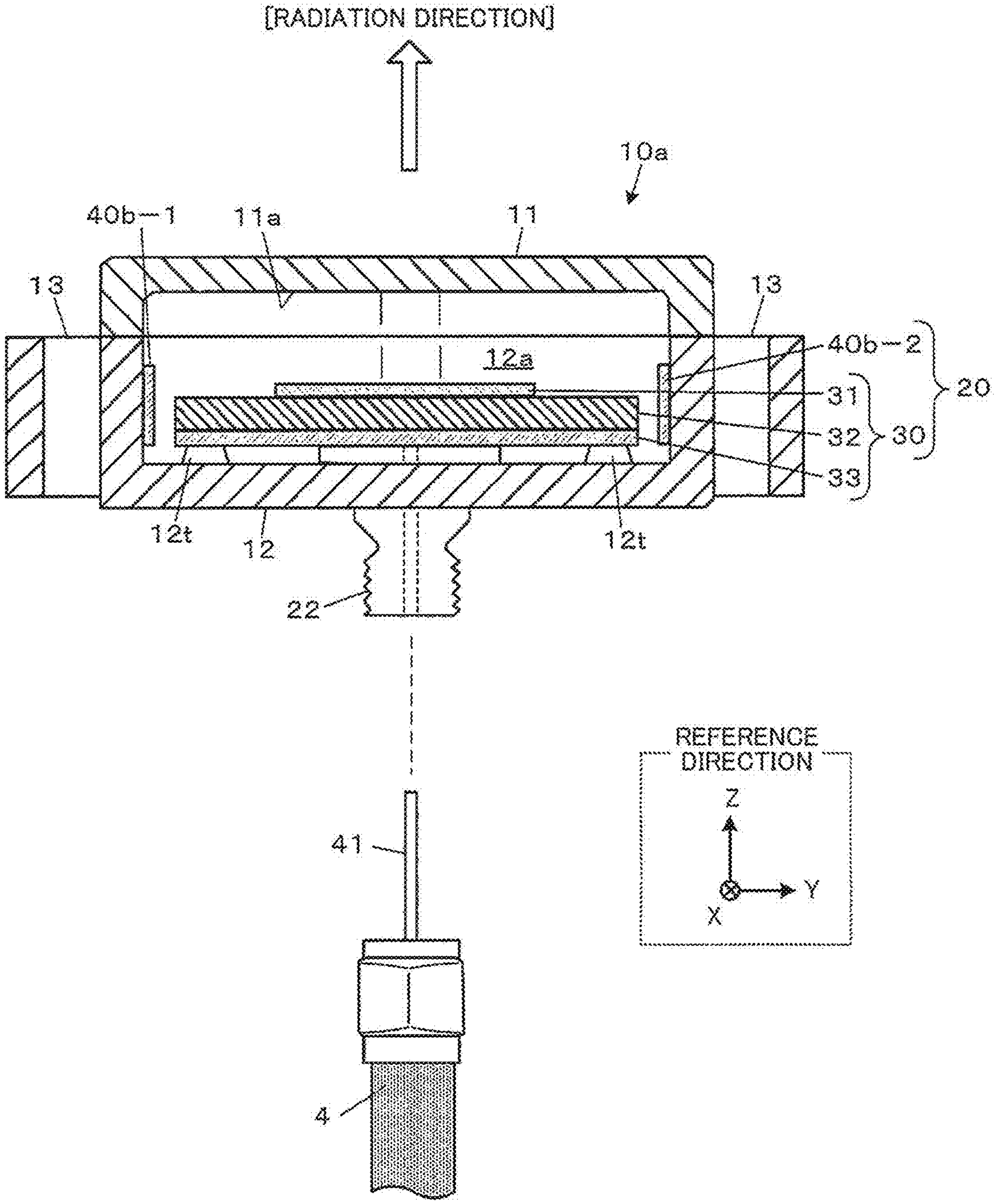
FIG. 11 is a diagram illustrating a modification in which a pair of parasitic elements is provided to outside a peripheral edge of a radiating element.

Also, in the above embodiment, description has been given of an example in which the pair of parasitic elements 40-1 and 40-2 is formed into a long strip shape and provided on the peripheral edges of the top face of the dielectric substrate 32. In contrast, for example, as illustrated in FIG. 11, a pair of parasitic elements **40*b*-1 and 40*b*-2 may be provided to outside the peripheral edges of the radiating element 31 as flat-plate portions or thin-film portions parallel or substantially parallel to each other. For example, the parasitic elements 40*b*-1 and may be placed by being pasted to an inner surface of the second housing 12. The pair of parasitic elements 40*b*-1 and 40*b*-2 according to the present modification has a quadrangular flat-plate or thin-film shape and are placed on opposite sides of a line segment connecting the center of the radiating element 31 and feeding point 31*h* and on opposite sides of the antenna main body 30 in such a way that the longitudinal direction will be orientated along the X-axis direction (direction of a line segment connecting the center of the radiating element 31 and feeding point 31*h***).

Other Examples of Modifications

Also, although in the above embodiment, the patch antenna 20 equipped with the pair of parasitic elements 40 (40-1 and 40-2) has been illustrated by example, the patch antenna 20 may be equipped with one parasitic element. For example, the patch antenna 20 may be equipped with any one of the parasitic elements 40-1 and 40-2. Also, the shape of the parasitic elements as viewed from the Z-axis positive direction is not limited to the rodlike shape (rectangular shape, to be exact) illustrated by example in the above embodiment, and may be a quadrangular shape such as a rectangular shape whose shorter length as viewed from the Z-axis positive direction is increased, a polygonal shape, a circular shape, an elliptical shape, or the like.

As described in detail above, the present embodiment and modifications thereof can improve the gain in low-elevation directions as viewed from the center of the radiating element. Regarding materials for the dielectric substrate 32, in addition to commonly-used ceramics, inexpensive materials such as glass are available for use.

Available materials for the dielectric substrate 32 include glass epoxy resin substrates designated by the National Electrical Manufacturers Association (NEMA) symbol FR-4, paper phenol substrates designated by the NEMA symbol XPC, paper epoxy substrates designated by the NEMA symbol FR-3, and glass composite substrates designated by the NEMA symbol CEM-3 as well as glass polyimide substrates, fluorine (ceramic) substrates, and glass PPO substrates. Then, selecting an appropriate one of these materials according to cost and performance requirements, it is possible to obtain a suitable patch antenna.

As the shape of the radiating element, not only a polygonal shape such as a quadrangular shape, but also a polygonal shape whose corners have been cut off, a circular shape, an elliptical shape, or the like in planar view in which the radiating element is seen from the direction perpendicular to the plate surface of the radiating element can be adopted.

EXPLANATION OF REFERENCES

10 Antenna device for vehicle
11 First housing

12 Second housing
13 Support
20 Patch antenna
22 Coaxial substrate connector
30 Antenna main body
31 Radiating element
31*h* Feeding point (core wire attachment hole)
32 Dielectric substrate
33 Ground plate
(40-1,40-2), 40*a*(40*a*-1,40*a*-2), 40*b*(40*b*-1,40*b*-2) Parasitic element
4, 4*a* Coaxial cable

The invention claimed is:

1. An antenna device configured to be installed in a predetermined orientation at a vehicle, the antenna device comprising:
- a radiating element having a surface shape;
- a parasitic element provided at a position spaced away from the radiating element in a planar view in which the radiating element is seen from a direction perpendicular to a surface of the radiating element; and
- a ground plate, wherein
- the predetermined orientation is at least one of a front side, a rear side, a right side, and a left side of the vehicle,
- the parasitic element does not overlap with the ground plate in a view from a side of the radiating element with respect to the ground plate,
- the radiating element is disposed so as to be parallel to a surface perpendicular to a traveling direction of the vehicle, and
- a pair of the parasitic elements is provided only on opposite sides of the radiating element in the planar view.

2. The antenna device according to claim 1, wherein a longitudinal direction of the parasitic element is oriented along a direction of a line segment connecting a center of the radiating element and a feeding point in the planar view.

3. The antenna device according to claim 1, wherein the parasitic element is provided on a same surface as the radiating element.

4. The antenna device according to claim 1, wherein the pair of parasitic elements includes a first parasitic element, and a second parasitic element which length in a longitudinal direction is longer than the first parasitic element.

5. The antenna device according to claim 1, wherein
the ground plate is provided at a position spaced away from the parasitic element.

6. The antenna device according to claim 1, wherein
the ground plate is provided at a position opposite to at least one of the radiating element and the parasitic element.

7. The antenna device according to claim 1, wherein
the ground plate has a surface shape,
wherein a line connecting the radiating element and the parasitic element does not intersect a surface including the ground plate.

8. The antenna device according to claim 1,
wherein the ground plate overlaps with at least one of at least a part of the radiating element and at least a part of the parasitic element in the planar view.

9. The antenna device according to claim 1,
wherein the parasitic element is provided at a position away from a center of gravity of the radiating element in the planar view.

10. The antenna device according to claim 1, further comprising a housing,
wherein each parasitic element of the pair of the parasitic elements is provided on only a part of an inner surface of the housing.

11. The antenna device according to claim 1,
wherein, in the planar view, a surface of the parasitic element which is furthest from the radiating element and a surface of the ground plate opposite to the radiating element are disposed on the same surface.

12. The antenna device according to claim 1, wherein a radiation direction of the antenna device is parallel to the traveling direction of the vehicle.

13. A vehicle including the antenna device according to claim 1, installed at the predetermined orientation, wherein a radiation direction of the antenna device is parallel to the traveling direction of the vehicle.

* * * * *